| (12) | United States Patent | (10) Patent No.: | US 11,487,822 B2 |
|---|---|---|---|
| | Ganti et al. | (45) Date of Patent: | Nov. 1, 2022 |

(54) FACILITATING SPATIAL INDEXING ON DISTRIBUTED KEY-VALUE STORES

(71) Applicant: International Business Machines Corporation, Armonk, NY (US)

(72) Inventors: Raghu Kiran Ganti, Elmsford, NY (US); Mudhakar Srivatsa, White Plains, NY (US); Dakshi Agrawal, Monsey, NY (US); Kisung Lee, Baton Rouge, LA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 317 days.

(21) Appl. No.: 16/007,976

(22) Filed: Jun. 13, 2018

(65) Prior Publication Data

US 2019/0384864 A1 Dec. 19, 2019

(51) Int. Cl.
*G06F 16/903* (2019.01)
*G06F 16/901* (2019.01)

(52) U.S. Cl.
CPC ...... *G06F 16/90335* (2019.01); *G06F 16/901* (2019.01)

(58) Field of Classification Search
CPC ... G06F 16/90335; G06F 16/901; G06F 16/29
See application file for complete search history.

(56) References Cited

U.S. PATENT DOCUMENTS

| 9,396,276 | B2 | 7/2016 | Hendrey | |
|---|---|---|---|---|
| 9,602,129 | B2 | 3/2017 | Agrawal et al. | |
| 9,719,790 | B2 | 8/2017 | Agrawal et al. | |
| 2008/0079734 | A1* | 4/2008 | Shearer | G06T 15/06 |
| | | | | 345/505 |
| 2012/0166446 | A1* | 6/2012 | Bowman | G06F 16/29 |
| | | | | 707/743 |
| 2013/0097163 | A1* | 4/2013 | Oikarinen | G06F 16/29 |
| | | | | 707/736 |

(Continued)

OTHER PUBLICATIONS

Fox, et al., "Spatio-temporal Indexing in Non-relational Distributed Databases," Last Accessed: Apr. 5, 2018, 9 pages.

(Continued)

*Primary Examiner* — Mark D Featherstone
*Assistant Examiner* — Samuel C Sharpless, III
(74) *Attorney, Agent, or Firm* — Amin, Turocy & Watson, LLP

(57) ABSTRACT

Techniques for inserting and extracting geolocation data using spatial indexing in a key value database are provided. In an embodiment, a system is provided for generating one or more geohashes for a geometry object, wherein the one or more geohashes comprises encoded bits that are stored as keys in a key value database. In one example, the system comprises a geometry indexing component that generates a spatial index, wherein the spatial index is based on a total number of the encoded bits generated for the one or more geohashes. In one example, the system comprises a geometry storing component that stores the geometry object and the one or more geohashes in the key value database using the spatial index to allow for faster retrieval of the geometry object. The advantage is that properly inserted and indexed spatial data can be quickly retrieved.

22 Claims, 12 Drawing Sheets

(56) References Cited

U.S. PATENT DOCUMENTS

| | | | |
|---|---|---|---|
| 2014/0266819 A1 | 9/2014 | Agrawal et al. | |
| 2014/0280375 A1 | 9/2014 | Rawson et al. | |
| 2016/0171027 A1* | 6/2016 | Agrawal | G06F 16/90344 707/743 |
| 2016/0196281 A1* | 7/2016 | Agrawal | G06F 16/9024 707/724 |
| 2017/0068688 A1* | 3/2017 | Brodt | G06F 16/29 |

OTHER PUBLICATIONS

Escriva, et al., "HyperDex: A Distributed, Searchable Key-Value Store," SIGCOMM'12, Aug. 13-17, 2012, Helsinki, Finland, 12 pages.

Anonymous, "System and Method for Accelerating Spatial Operations," Publication Date: Feb. 12, 2015, 11 pages.

Anonymous, "System and Method for NoSQL-RDB Data Movement on Monitoring Data," Publication Date: Mar. 28, 2016, 7 pages.

\* cited by examiner

1

FACILITATING SPATIAL INDEXING ON DISTRIBUTED KEY-VALUE STORES

STATEMENT REGARDING FEDERALLY SPONSORED RESEARCH OR DEVELOPMENT

This invention was made with Government support under Contract No.: W911NF-09-2-0053 awarded by Army Research Office (ARO). The Government has certain rights in this invention.

BACKGROUND

The subject disclosure is related generally to spatial indexing and fast retrieval of data, and more specifically to spatial indexing for distributed key-value to store spatial temporal and moving data.

Today, there is a desire to provide information to specific customers that are geographically near particular businesses or within a certain geographical location. For example, there may be a desire to push coupons to customers between 30-40 years old, who made a purchase of a specific item within the last two days, and who are within 200 feet from the particular business. In order to provide this information to businesses, a delivery system that can quickly process unstructured data and is extremely dynamic is employed. The use of traditional databases is very costly and require vertical and horizontal expansion of servers to maintain and track such information. Currently, relational databases are used to store large amounts of data. As more data is stored, the cost increases due to required number of servers needed and efficiency goes down when processing multi-range scans across all the servers. Thus, a relational database is not the best solution for all possible types of situations (e.g., the various multi-range queries).

In order to keep the cost down, a non-SQL or non-relational (NoSQL) store (e.g., NoSQL database or a key value database) is employed to store large amounts of data. The NoSQL stores are able to handle unstructured and unpredictable data. The NoSQL store is not a SQL database and offers rich query capabilities and can be easily scaled. NoSQL stores are gaining industry support, especially in storing geo mapping data. However, an identified problem is that a NoSQL database does not support spatial indexing to allow for k-nearest neighbors (e.g., a nearest-based search to show all the coffee shops nearest me where someone bought a cup of coffee), for contained-in (e.g., show all the taxis with a given boundary that picked up at least one passenger in the last two hours) and within-distance types of queries (e.g., distance-based search to show all mobile users located 0.3 miles from a restaurant so that the can receive a promotional code). Also, another limitation is that NoSQL stores support a single dimensional range scan, such as, a query for "all people in the 20-30 year-old range or all people having a salary of $100K-$200K" or a query for "all names that start with M-P." However, there is a desire to perform multidimensional range scans.

Although NoSQL is a preferred choice for storing large sets of data, the problem is getting the desired information out quickly and efficiently without having to use extensive computer equipment. Since NoSQL supports single dimensional scans, obtaining real-time answers to a multi-dimensional query will be problematic. As used herein, the term "real-time" is related to data processing system in which a computer receives constantly changing data, such as geometry data, purchase habits of consumers, etc., and responds to a query providing the most up-to-date data available at the time of receipt of the query. Accordingly, the term "real-time" need not be limited to be any particular amount of time after receipt of the query.

Thus, solutions and techniques are employed in one or more embodiments described herein that efficiently use NoSQL stores for inserting geometry data and quickly processing the queries to allow businesses to obtain data (e.g., in some cases, real-time data) about potential customers.

SUMMARY

The following presents a summary to provide a basic understanding of one or more embodiments of the invention. This summary is not intended to identify key or critical elements, delineate scope of the particular embodiments or scope of the claims. Its sole purpose is to present concepts in a simplified form as a prelude to the more detailed description that is presented later. In one or more embodiments described herein, systems, computer-implemented methods, apparatus and/or computer program products that facilitate spatial indexing of a key value store are described.

According to an embodiment, a system comprises a memory that stores computer executable components, and a processor that executes computer executable components stored in the memory. In one example, the system comprises a geometry hashing component that generates one or more geohashes for a geometry object, where the one or more geohashes comprises one or more encoded bits that are stored as keys in a key value database. In one example, the system comprises a geometry indexing component that generates a spatial index, where the spatial index is based on a total number of the encoded bits generated for the one or more geohashes. In one example, the system comprises a geometry storing component that stores the geometry object and the one or more geohashes in the key value database using the spatial index to allow faster retrieval of geometry object. The advantage is that properly inserted and indexed spatial data can be quickly retrieved.

In some examples, the key value database comprises one or more levels, wherein a single level of the one or more levels is used to store the geometry object. The advantage of such a system is that multiple levels can be scanned at the same time to find the geometry object, which in turn will reduce overall search time.

In another embodiment, a computer-implemented method is provided. In one example, the computer-implemented method comprises: generating, by a geometry hashing component operatively coupled to a processor, one or more geohashes for a geometry object, wherein the one or more geohashes includes one or more encoded bits stored as keys in a key value database; and generating, by a geometry indexing component operatively coupled to the processor, a spatial index, wherein the spatial index is based on a total number of the one or more encoded bits generated for the one or more geohashes. The computer-implemented method can also comprise inserting, by a geometry storing component operatively coupled to the processor, the geometry object and the one or more geohashes in the key value database using the spatial index to allow for faster retrieval of the geometry object.

In some examples, the key value database used for the computer-implemented method comprises one or more levels, where a single level of the one or more levels is used to store the geometry object. The advantage of such a method is that multiple levels can be scanned at the same time to find the geometry object, which in turn will reduce overall search time.

In another embodiment, a system comprises a memory that stores computer executable components, and a processor that executes computer executable components stored in the memory. In one example, the system comprises a geometry query processing component that receives a query specifying an objective for a geographic location with respect to a geometry object and generates a geohash of the query, where the geohash is a set of bits representing keys in a key value database. In one example, the system comprises a geometry query results component that identifies the geometry object, by generating an initial list of keys and conducting a simultaneous search of all levels of the key value database to allow for fast retrieval of the geometry object, where the initial list of keys comprises one or more keys stored in the key value database that match the geohash. The advantage is that by searching all the levels in parallel, the geometry object can be found quickly and efficiently.

In some examples, the geometry query results component generates a pruned list of keys, wherein the pruned list of keys comprises a list of keys that match with the objective. The advantage is that by generating a second list that filtered unmatched data, the overall speed is increased for identifying the accurate geometry objects.

In another embodiment, a computer-implemented method is provided. In one example, the computer-implemented method comprises: receiving, by a geometry query processing component operatively coupled to a processor, a query specifying an objective for a geographic location with respect to a geometry object; and generating, by the geometry query processing component, a geohash of the query, wherein the geohash is a set of bits representing keys in a key value database. In some embodiments, the computer-implemented method can further comprise identifying, by the processing component, the geometry object, by generating an initial list of keys and conducting a simultaneous search of all levels of the multi-level key value database, wherein the initial list of keys comprises keys stored in the key value database to match the geohash.

In some examples, the computer-implemented method comprises generating, by the processing component, a pruned list of keys, wherein the pruned list of keys comprises a set of keys that match with the objective. The advantage is that by searching all the levels in parallel, the geometry object can be found quickly and efficiently.

In another embodiment, a computer program product for inserting and extracting geolocation data using spatial indexing in a key value database is provided, the computer program product comprising a computer readable storage medium having program instructions embodied therewith. The program instructions can be executable by a processor and cause the processor to: receive, by the processor, a query specifying an objective for a geographic location with respect to a geometry object; generate, by the processor, a geohash of the query, where the geohash is a set of bits representing keys in a key value database; and identify, by the processor, the geometry object, generate an initial list of keys and conduct a simultaneous search of all levels of the key value database to allow for fast retrieval of the geometry object, wherein the initial list of keys comprises a set of keys stored in the key value database that match a prefix of the geohash to a prefix of key stored in the key value database.

In some examples, the program instructions can be further executable by a processor and cause the processor to generate, by the processor, a pruned list of keys, wherein the pruned list of keys comprises a list of keys that match with the objective. The advantage is that by searching all the levels in parallel using a prefix for searching, the geometry object can be found quickly and efficiently.

DETAILED DESCRIPTION

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the above problems with using traditional relational databases and NoSQL store, one or more embodiments can be implemented to produce a solution to at least some of these problems in the form of using spatial indexing that can generate multiple single dimensional keys (e.g., geohashes) from a multi-dimensional geometry object and using a multi-level storage scheme for NoSQL store to insert the geometry object. Generating the geohashes for a given geometry object has an advantage that allows businesses to insert multi-dimensional geometry objects into a NoSQL store. Using single dimensional keys has an advantage of fast and efficient processing of future multi-dimensional queries. Another advantage of generating geohashes is that information from the generated geohashes can be used to identify the best fit level for the NoSQL store to insert the geometry object. Storing geometry objects at a given level in a NoSQL based on information from the generated geohashes has the advantage of conducting parallel scans of each level to quickly and efficiently discover the inserted geometry object. The implementation of one or more embodiments of the invention using artificial intelligence and data analytics has further technological advantages, such as reduced use of energy, storage equipment and reduced use of telecommunication resources.

Figure 1:
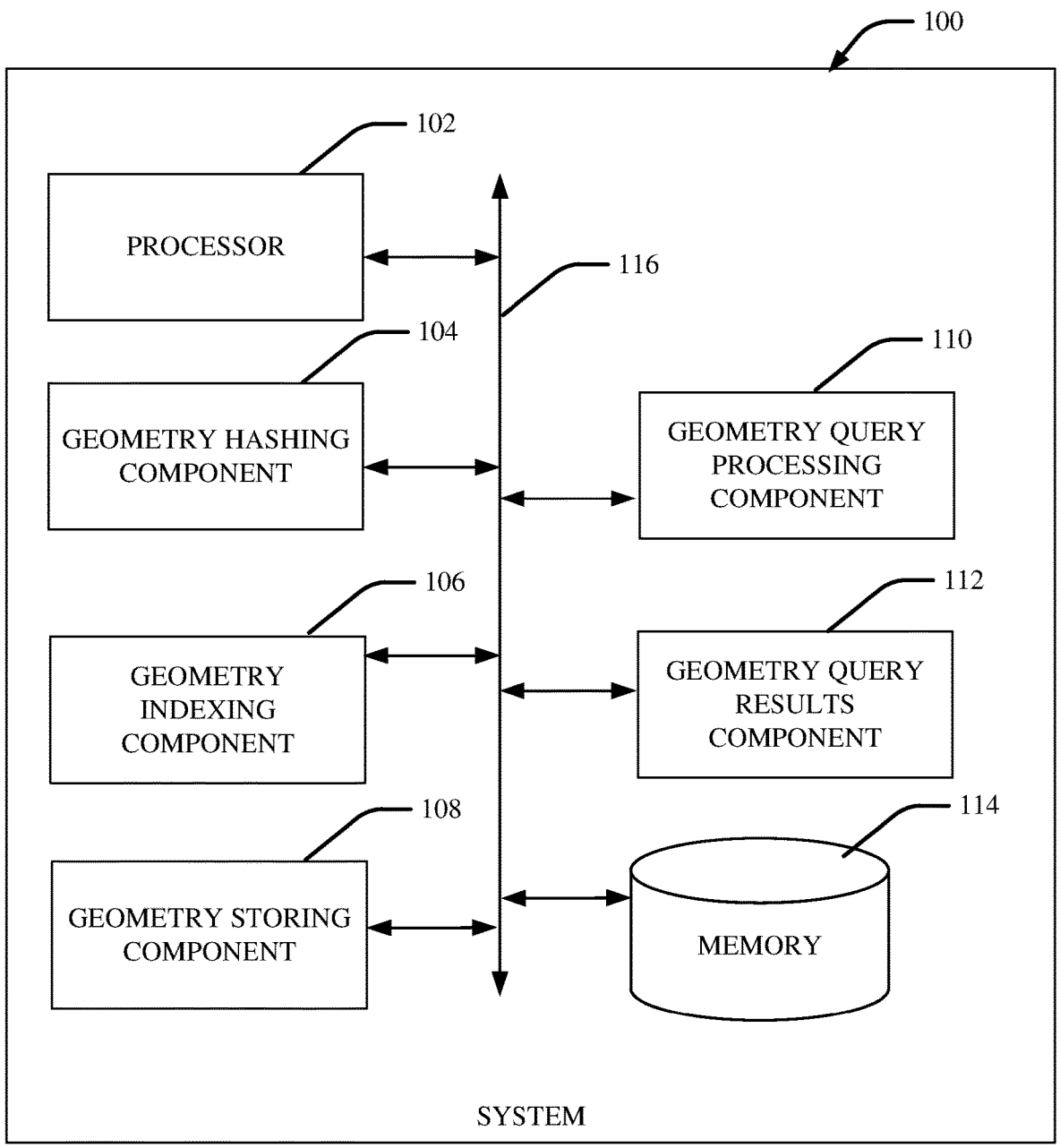
FIG. 1 illustrates a block diagram of an example, non-limiting computer implemented system that can facilitate a process of inserting and a process of extracting geospatial data using a NoSQL database in accordance with one or more embodiments describe herein.

FIG. 1 illustrates a block diagram of an example, non-limiting computer implemented system 100 that can facilitate a process of inserting and a process of extracting geospatial data using a NoSQL database in accordance with one or more embodiments describe herein. Also, system 100 can facilitate a process using a parallel search to quickly identify results of a query in a particular context in accordance with one or more embodiments described herein. Aspects of systems (e.g., system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 114. The system 100 can further include a system bus 116 that can couple various components including, but not limited to, a geometry hashing component 104, a geometry indexing component 106, a geometry storing component 108, a geometry query processing component 110 and a geometry query results component 112. The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, a memory 114 can store computer executable components executable by the processor 102. A geometry hashing component 104 can receive a geometry object to store into memory 114. In an embodiment, geometry objects to be stored may be a single point data or range (e.g., 1-dimensional), spatial data (e.g., 2-dimensional, like latitude and longitude), altitude (e.g., 3-dimensional) and time (4-dimensional). Depending on the information being collected and wanted to be stored in NoSQL stores, the dimension of the geometry object can be large. Any suitable format and method can be used for building a geometry object. For example, the geometry object can be geomapping data formatted as (A, B, C, D), wherein A can be used to identify an item (e.g., school), B can be geospatial data (e.g., a boundary defined by latitude and longitude for the area covered by the school), C can be altitude information, and D can remain blank in some embodiments. In another example, the geometry object of three dimensions (taxi pickup, geospatial data, and time) can be used to insert how many taxi pickups occurred in each area during a given time.

The geometry hashing component 104 can generate one or more geohashes for the geometry object. In an embodiment, a bounding box (e.g., a smallest box for a point set in N dimension is the box with the smallest measure wherein all the points of the geometry objects are contained therein) is computed for a geometry object. Based on the size of the bounding box (e.g., number of bits used to encode the geohash), geohash bit depth is selected. In an embodiment, a table that relates size in units (e.g., meters/feet/yards) to number of bits used for encoding geohash is used to determine the bit depth. Any suitable structure can be used to determine the bit depth in accordance with the innovation. In an embodiment, a geohash bit depth table, stored memory 114, comprising a level value, number of bits value, and a range value is used. For example, the geohash bit depth table, wherein depth level 1 can represent 5 bits used to define bounding box sized 1000 square meters; and bit level 2 can represent 6 bits used to define bounding box sized 100 square kilometers. At the selected bit depth, a collection of geohashes that fully cover the geometry object is determined (e.g., the geometry object is contained in the union of the geohashes). In an embodiment, the number of geohashes that are generated can be defined by the dimension of the geometry. For example, using a formula, $3^N-1$, where N is number of dimension of geometry object, a maximum number of geohashes to be generated is determined based on dimension information of the geometry object. In an embodiment, each geohash (or, in some embodiments, one or more geohashes) represents an encoded key comprising a set of (or, in some embodiments, one or more) bits and representing a single spatial dimensional range value (e.g., range based latitude and longitude values). The number of bits used for a geohash depends on the size of the geometry object.

The geometry hashing component 104 can use any suitable model to generate geohashes using the geospatial data information (e.g., the boundaries on Earth) provided in the geometry object. For example, the geospatial data is divided into boxes, wherein each box can be defined by geospatial data (e.g., latitude, longitude by latitude longitude) to represent a geohash. Each box can be encoded using any suitable model to generate a set of bits. For example, one method of encoding the box into a bit vector is to use geohashes. Geohashes work by iteratively dividing a region, starting from full Earth, into four regions. The label associated with full Earth is Φ (empty/null bit vector). Subsequent four divisions of any box with label b are labeled {b00, b01, b11, b10}, i.e., by concatenating {00, 01, 11, 10} to the label b. Note that Φ with any bit vector b results in b. In an embodiment, each geohash has a prefix portion and body portion. Each geohash is encoded as a bit vector. For example, a bit vector b=concat(b1, b2) (e.g., 0010=concat (001, 0)). Then b1 is the prefix and b2 is the suffix/body.

The prefix and the body are based on the size of the box selected for the geohash. The prefix can present regional location information. For example, if the Earth is divided into 16 polynomial boxes using latitude and longitude, the prefix can be one of the polynomial. The body can represent all additional granular polynomials. For example, 16 bounding boxes can be binary encoded into bit vectors whose size is 4. These bit vectors range from 0000 to 1111. For any bit vector b=concat(b1, b2), b1 represents a coarse grained box (i.e., b is contained in b1) and the addition of the suffix b2 defines a more granular box b. In the extreme case if b1=Φ (empty/null bit vector) then this represents the Full Earth—the highest level of coarse grained representation of any geometry. In the other extreme case if the length of b is 64 then the geometry size is bound by 9.4 mm×9.4 mm (which for many practical applications is considered as a "point" geometry).

A geometry indexing component 106 can generate a spatial index that is based on the total number of encoded bits generated by all the geohashes. For example, in an embodiment, the NoSQL store is configured using a multiple level scheme for storing the geohashes and the geometry object. Each level is defined based on resolution desired. In a non-limiting example, 4 levels (e.g., 0, 10, 20, 30 resolutions) are used, starting with 0. A spatial index can be used to identify each level. Spatial index 0 is a catch all (e.g., level 0—any geometry object, such as the whole earth, can be inserted). Spatial index 1 will store all geometry objects that produce 0-10 bits; spatial index 2 can be set to store all geometry objects that produce 10-20 bits; and spatial index 3 can be setup to store all geometry objects that produce more than 20 bits. For example, if the geometry object is very large, then it is likely to get stored at level 0; a strip of road may get set in level 20; and a small house may get stored in level 30. Based on a prior knowledge of what the NoSQL store is going to track (e.g., houses, roads, cities, countries, etc.), the total number of levels and the resolution of the levels can be defined. The geometry indexing component 106 can determine the total number of encoded bits that were generated for the geohashes. Using the total number of encoded bits, the special index can be determined using the model discussed above.

The geometry storing component 108 can determine the best level to insert the geometry object and all the geohashes by using the spatial index. For example, if the total number of encoded bits generated for a given geometry object was 24, then the spatial index in the example above would be equal to 2. In an embodiment, if the total number of bits were undetermined (for example, the whole earth was provided), then spatial index 0 will be used as a catch-all. Spatial index 0 holds geohash of length 0 (i.e., Φ—the null/empty bit vector). The Φ bit vector represents the full Earth. Since we are indexing objects on Earth, the geohash encoded as Φ is guaranteed to cover any input geometry object.

The geometry query processing component 110 can receive a query specifying an objective for a geographic location with respect to a geometry object. The query can have an objective (e.g., what the requestor wants) and geolocation information that can be associated with the objective. The query can have additional range information to aid in finding the geometry objects stored in the NoSQL store. The objective can be a distance-based objective to find relative geometry objects within a distance. For example, "find closest geometry objects within a distance to geolocation." The objective can be a nearest-based objective to find relative geometry objects nearest to the person or a place. For example, "find all those who bought coffee yesterday near my store" The objective may be a contained within-based objective to find relative geometry objects contained in a defined area. For example, "find all taxis operating in Times Square." The geometry query processing component 110 can generate a geohash of the query (e.g., geohash of the geolocation portion of the query), wherein the geohash is one or more (or, in some embodiments, a set of) bits representing keys in a key value database. In an embodiment, a query includes a search geometry (e.g., a point) and a search radius (300 m). First the bounding box for the search geometry object is computed. The bounding box is expanded to cover the search radius. Given the size of the expanded bounding box, geohash bit depth is determined as discussed above. The expanded geohash is then covered using geohashes at the determined bit depth.

The geometry query processing component 110 can use the geohash to identify the geometry object. For example, both geometry in the database and the query (search geometry+search radius) can be all encoded as bit vectors, a search operation simply requires us to match these bit vectors. Two-bit vectors b1 and b2 match if b1 is a prefix of b2 or b2 is a prefix of b1. For example, (0010, 00) match, while (0010, 01) do not match. The geometry query processing component 110 can generate an initial list of keys using the geohash. As described above the search geometry and search radius are converted into geohashes, first by computing the bounding box for the search geometry, then stretching the box by the said search radius and then covering the bounding box with no more than $3^N-1$ geohashes. The geometry query processing component 110 can match the geohash to the one or more keys stored in the key value database to create the initial list of keys.

The geometry query processing component 110 can search all the levels of the key value database simultaneously (or, concurrently) to quickly and efficiently build the initial list of keys. The geometry query processing component 110 can use a prefix of the geohash and a prefix of the keys stored in the key value database to perform the matching. For example, given a bit vector b1 obtained from (search geometry, search radius) and b2 obtained for the inserted geometry they match if and only if b1 is a prefix of b2 OR b2 is a prefix of b1. For example, (0010, 00) match, while (0010, 01) do not match.

The geometry query processing component 110 can build a pruned list of keys by comparing the objective of the query against the geometry object. The geometry query processing component 110 can remove (e.g., prune) keys that don't match the objective of the query. By pruning the unmatched keys, the geometry query processing component 110 can generate the final results faster and with accuracy.

The geometry query results component 112 can examine the distance of the stored geometry object and the geolocation of the query. If the distance is within the distance specified in the query, then the geometry query results component 112 can keep the key in the pruned list of keys. The geometry query results component 112 can repeat this process until all the keys have been examined. The geometry query results component 112 can select the closest geometry object from the final remaining list of keys.

The various components (e.g., processing component comprising a geometry hashing component 104, a geometry indexing component 106, geometry query processing component 110 and geometry query results component 112) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to various types of neural networks in their particular context. The subject computer processing systems, methods apparatuses and/or computer program products can be employed to solve new problems that arise through advancements in technology, computer networks, the Internet and the like.

Embodiments of devices described herein can employ artificial intelligence (AI) to facilitate automating one or more features described herein. The components can employ various AI-based schemes for carrying out various embodiments/examples disclosed herein. To provide for or aid in the numerous determinations (e.g., determine, ascertain, infer, calculate, predict, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

Figure 2:
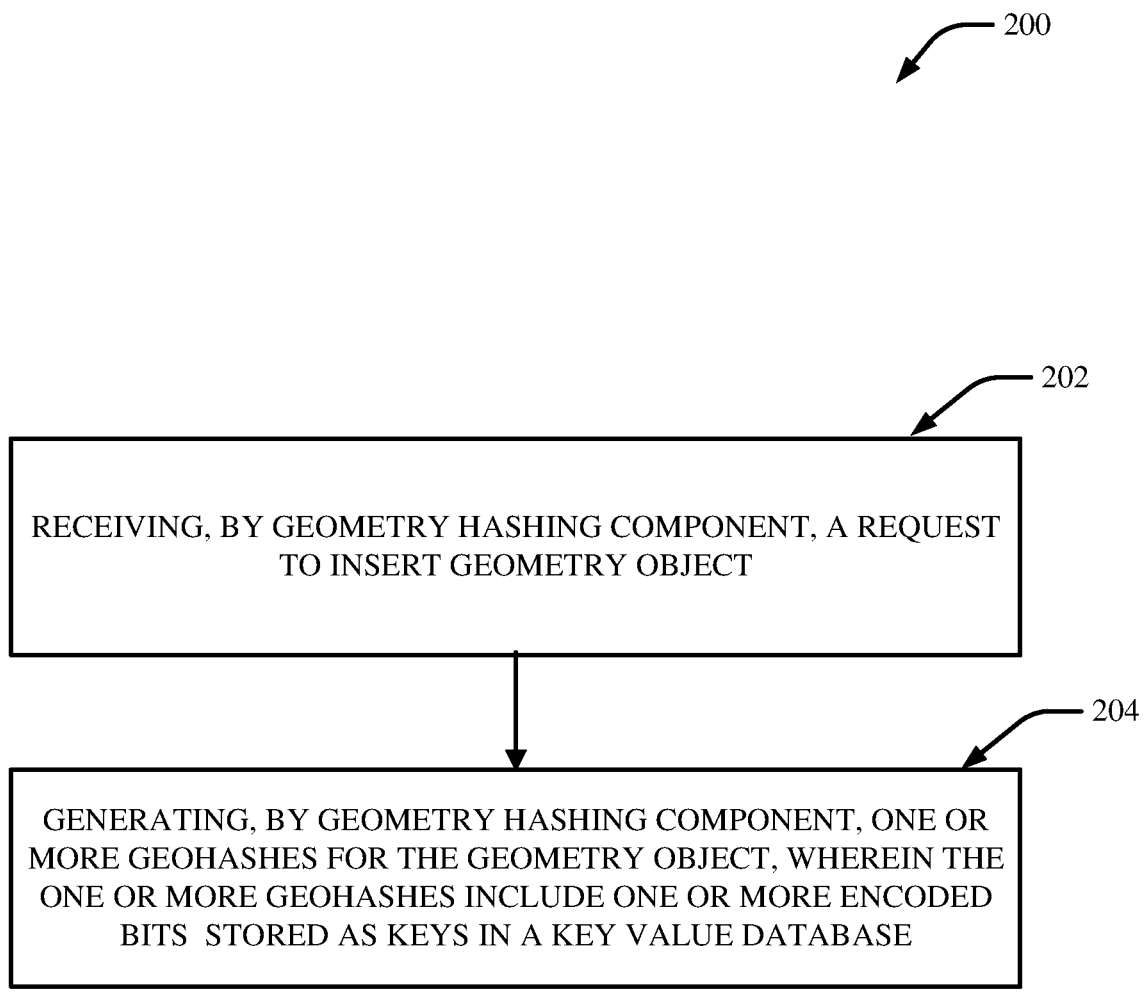
FIG. 2 depicts a diagram of an example, non-limiting computer implemented method that facilitates generating geohashes for a geometry object in accordance with one or more embodiments describe herein.

FIG. 2 depicts a diagram of an example, non-limiting computer implemented method that facilitates generating geohashes for a geometry object in accordance with one or more embodiments describe herein. Repetitive description of like elements employed in other embodiments described herein is omitted for sake of brevity.

In some examples, flow diagram 200 can be implemented by operating environment 1200 or 100 described below. It can be appreciated that the operations of flow diagram 200 can be implemented in a different order than is depicted.

In non-limiting example embodiments, a computing device (or system) (e.g., computer 1212 or system 100) is provided, the device or system comprising one or more processors and one or more memories that stores executable instructions that, when executed by the one or more processors, can facilitate performance of the operations as described herein, including the non-limiting methods as illustrated in the flow diagrams of FIG. 2. As a non-limiting example, the one or more processors can facilitate performance of the methods by directing or controlling one or more equipment operable to perform semiconductor fabrication.

Operation 202 depicts receiving, via the geometry hashing component 104, a request to insert a geometry object (e.g., requested by entities that collect geolocation data). Operation 204 depicts, generating, via the geometry hashing component 104, one or more geohashes for a geometry object, wherein the one or more geohashes include one or more encoded bits that are stored as keys in a key value database (e.g., converting multi-dimensional geometry object into multiple single dimensional keys).

Figure 3:
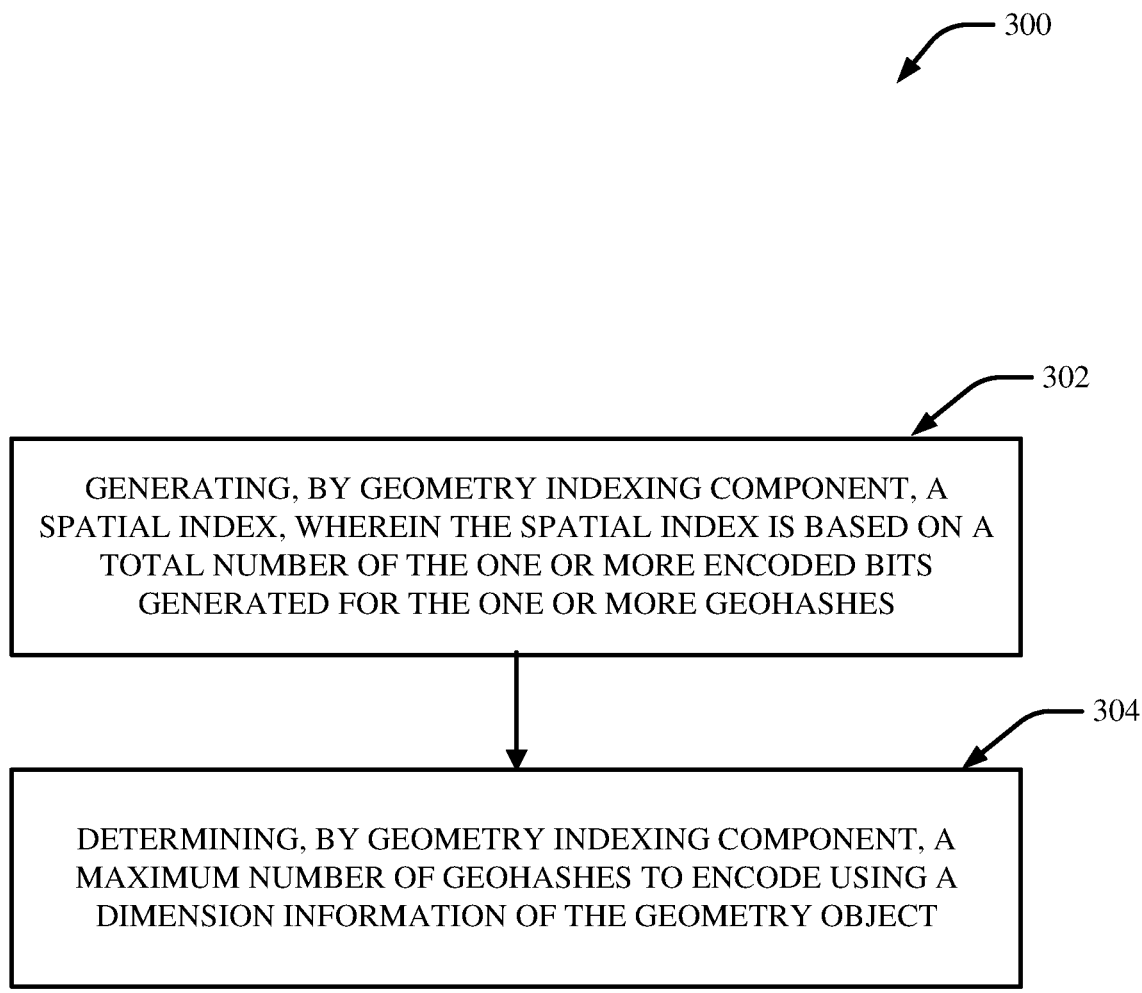
FIG. 3 depicts a diagram of an example, non-limiting computer implemented method that facilitates generating a spatial index in accordance with one or more embodiments describe herein.

FIG. 3 depicts a diagram of an example, non-limiting computer implemented method that facilitates generating a spatial index in accordance with one or more embodiments describe herein. Repetitive description of like elements employed in other embodiments described herein is omitted for sake of brevity.

In some examples, flow diagram 300 can be implemented by operating environment 1200 or 100 described below. It can be appreciated that the operations of flow diagram 300 can be implemented in a different order than is depicted.

In non-limiting example embodiments, a computing device (or system) (e.g., computer 1212) is provided, the device or system comprising one or more processors and one or more memories that stores executable instructions that, when executed by the one or more processors, can facilitate performance of the operations as described herein, including the non-limiting methods as illustrated in the flow diagrams of FIG. 3. As a non-limiting example, the one or more processors can facilitate performance of the methods by directing or controlling one or more equipment operable to perform semiconductor fabrication.

Operation 302 depicts generating, via geometry indexing component 106, a spatial index, wherein the spatial index is based on a total number of the encoded bits generated for the geohashes (e.g., add all the bits that make the multiple single dimensional keys and find the best fit level designated by the spatial index to insert the geometry object). Operation 304 depicts determining, via geometry indexing component 106, a maximum number of geohashes to encode using a dimension information of the geometry object (e.g., $3^N-1$, where N is number of dimension of geometry object).

Figure 4:
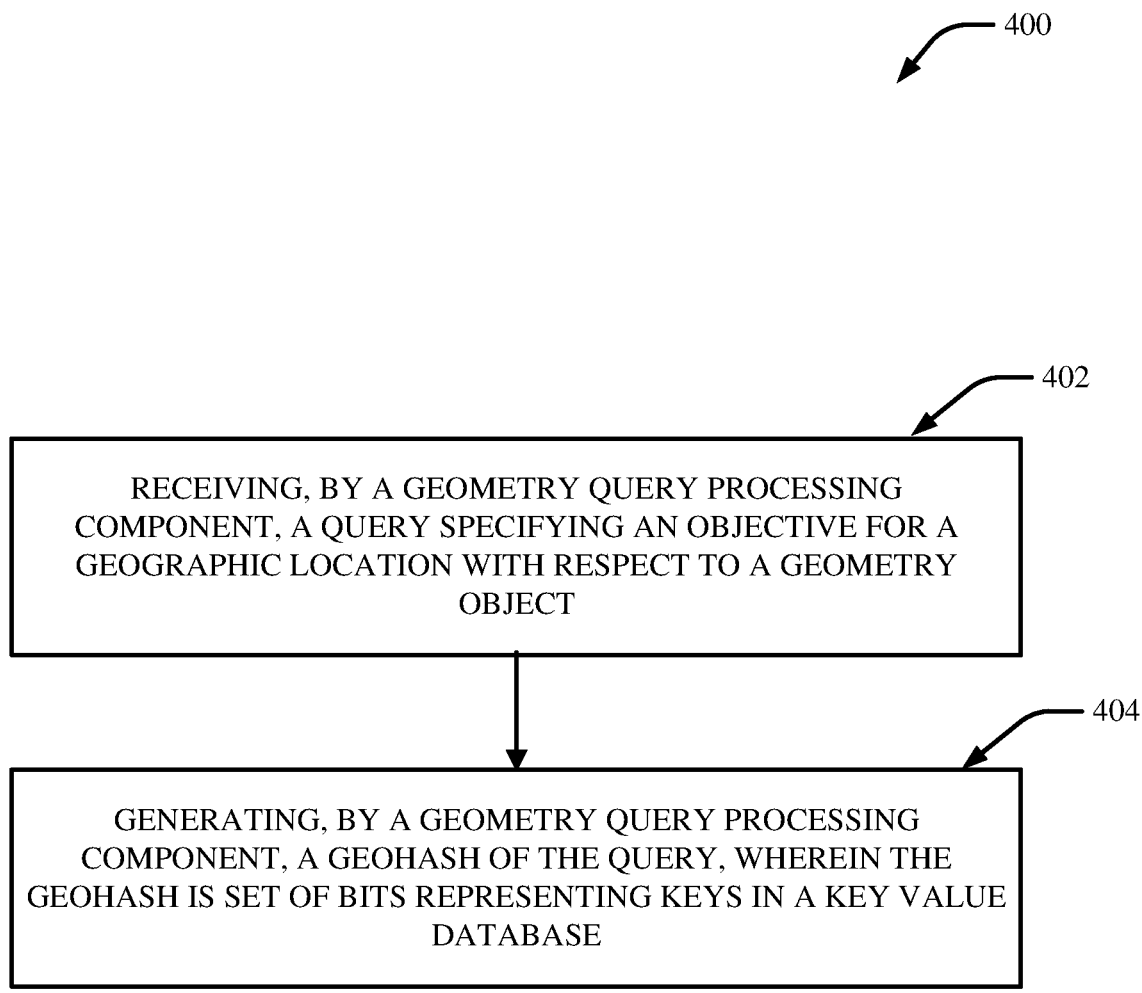
FIG. 4 depicts a diagram of an example, non-limiting computer implemented method that facilitates receiving a query in accordance with one or more embodiments describe herein.

FIG. 4 depicts a diagram of an example, non-limiting computer implemented method that facilitates receiving a query in accordance with one or more embodiments describe herein. Repetitive description of like elements employed in other embodiments described herein is omitted for sake of brevity.

In some examples, flow diagram 400 can be implemented by operating environment 1200 or 100 described below. It can be appreciated that the operations of flow diagram 400 can be implemented in a different order than is depicted.

In non-limiting example embodiments, a computing device (or system) (e.g., computer 1212) is provided, the device or system comprising one or more processors and one or more memories that stores executable instructions that, when executed by the one or more processors, can facilitate performance of the operations as described herein, including the non-limiting methods as illustrated in the flow diagrams of FIG. 4. As a non-limiting example, the one or more processors can facilitate performance of the methods by directing or controlling one or more equipment operable to perform semiconductor fabrication.

Operation 402 depicts receiving, via the geometry query processing component 110, a query specifying an objective for a geographical location with respect to a geometry object. (e.g., find k-nearest neighbors). Operation 404 depicts generating, via the geometry query processing component 110, a geohash of the query, wherein the geohash is a set of bits representing keys in a key value database (e.g., taking the geolocation and generating geohashes and using them as keys to find the same type of geohashes in the key values database).

Figure 5:
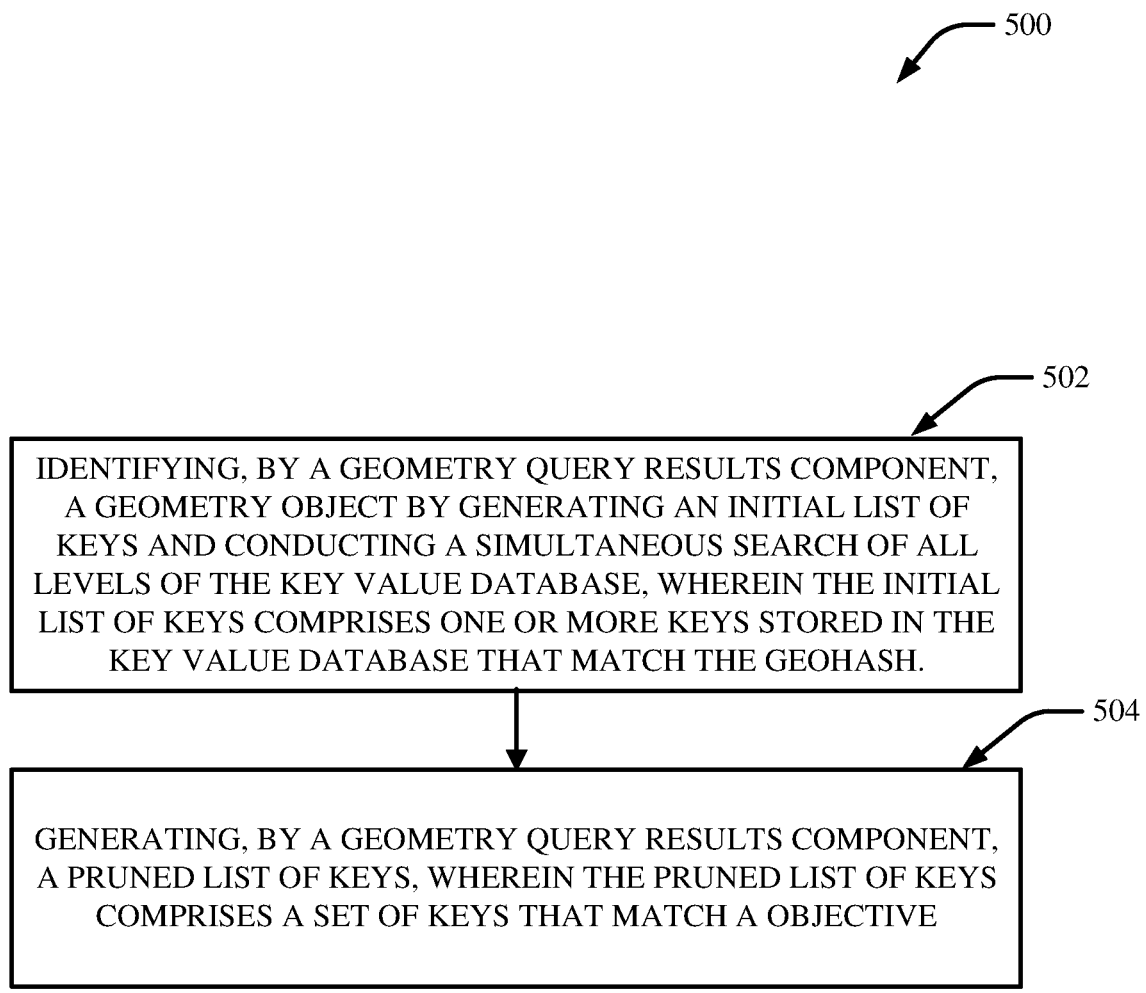
FIG. 5 depicts a diagram of an example, non-limiting computer implemented method that facilitates identifying the geometry object stored in a key value database in accordance with one or more embodiments describe herein.

FIG. 5 depicts a diagram of an example, non-limiting computer implemented method that facilitates identifying the geometry object stored in a key value database in accordance with one or more embodiments describe herein. Repetitive description of like elements employed in other embodiments described herein is omitted for sake of brevity.

In some examples, flow diagram 500 can be implemented by operating environment 1200 or 100 described below. It can be appreciated that the operations of flow diagram 500 can be implemented in a different order than is depicted.

In non-limiting example embodiments, a computing device (or system) (e.g., computer 1212) is provided, the device or system comprising one or more processors and one or more memories that stores executable instructions that, when executed by the one or more processors, can facilitate performance of the operations as described herein, including the non-limiting methods as illustrated in the flow diagrams of FIG. 5. As a non-limiting example, the one or more processors can facilitate performance of the methods by directing or controlling one or more equipment operable to perform semiconductor fabrication.

Operation 502 depicts identifying, via the geometry query results component 112, the geometry object, by generating an initial list of keys and conducting a simultaneous search of all levels of the key value database to allow for fast retrieval of the geometry object, wherein the initial list of keys comprises one or more keys stored in the key value database that match the geohash (e.g., using the geohashes/ keys of the query to search all the level of the NoSQL store to find the geometry object). Operation 504 depicts generating, via the geometry query results component 112, a pruned list of keys, wherein the pruned list of keys comprises a set of keys that match an objective.

Figure 6:
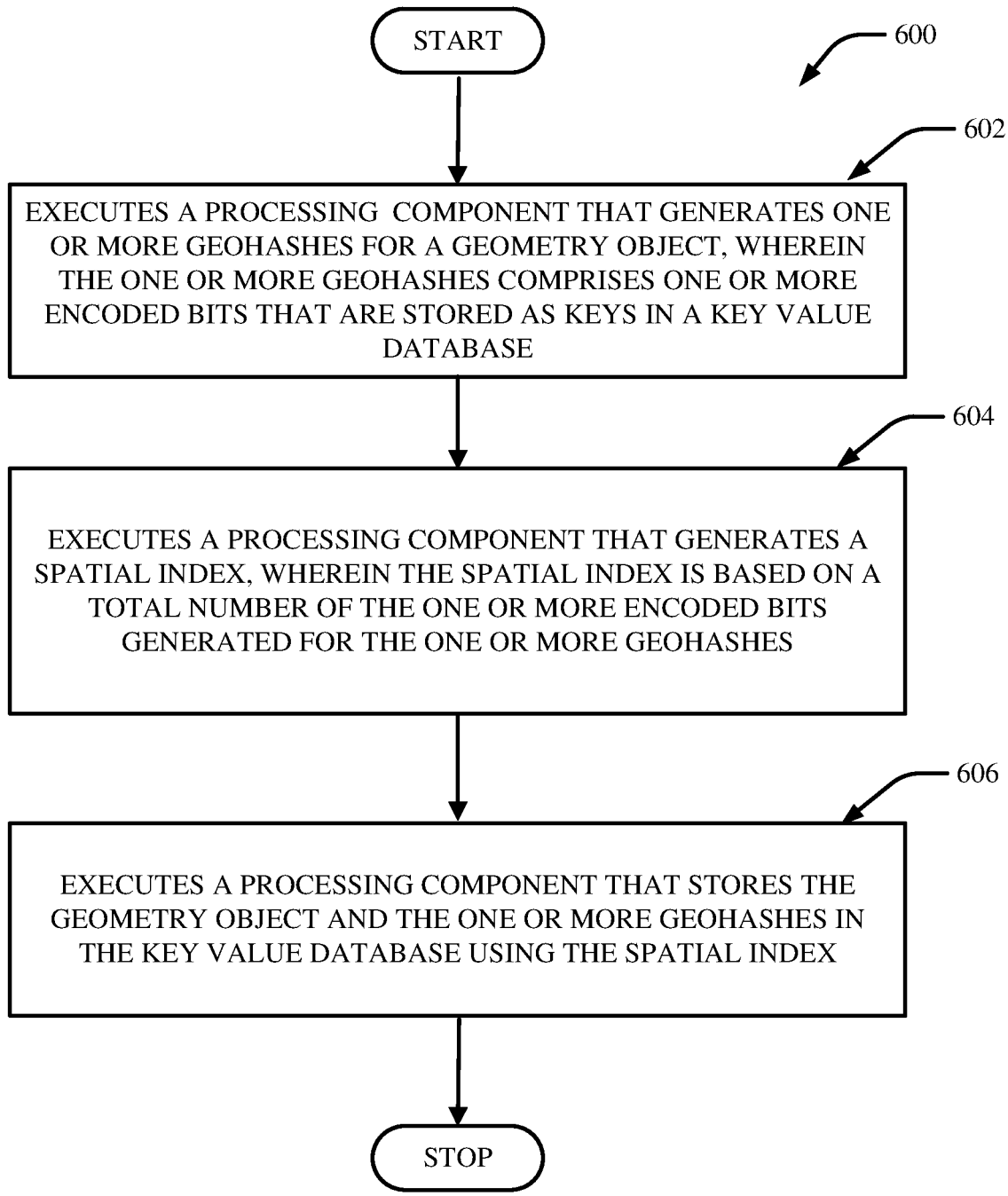
FIG. 6 illustrates a flow diagram of an example, non-limiting computer-implemented method that facilitates inserting a geometry object in a NoSQL store in accordance with one or more embodiments describe herein.

FIG. 6 illustrates a flow diagram of an example, non-limiting computer-implemented method that facilitates inserting a geometry object in a NoSQL store in accordance with one or more embodiments describe herein. Repetitive description of like elements employed in other embodiments described herein is omitted for sake of brevity.

In some examples, flow diagram 600 can be implemented by operating environment 1200 or 100 described below. It can be appreciated that the operations of flow diagram 600 can be implemented in a different order than is depicted.

In non-limiting example embodiments, a computing device (or system) (e.g., computer 1212) is provided, the device or system comprising one or more processors and one or more memories that stores executable instructions that, when executed by the one or more processors, can facilitate performance of the operations as described herein, including the non-limiting methods as illustrated in the flow diagrams of FIG. 6. As a non-limiting example, the one or more processors can facilitate performance of the methods by directing or controlling one or more equipment operable to perform semiconductor fabrication.

An advantage of the method as depicted in FIG. 6 can be that a multi-dimensional geometry object can be inserted as single dimensional in a NoSQL store (e.g., key value database that is single dimensional), while keeping the spatial indexing. Another advantage is using a best fit level, wherein the storage size is easily managed for geometry objects of varying size by limiting the level where the geometry object will be stored.

Operation 602 depicts generating, via geometry hashing component 104, geohashes for a geometry object, wherein the geohashes comprise one or more encoded bits that are stored as keys in a key value database (e.g., converting multi-dimensional geometry object into multiple single dimensional keys). Operation 604 depicts generating, via geometry indexing component 106, a spatial index, wherein the spatial index is based on a total number of the encoded bits generated for the geohashes (e.g., add all the bits that make the multiple single dimensional keys and find the best fit level designated by the spatial index to insert the geometry object). Operation 606 depicts inserting, via geometry storing component 108, the geometry object and the geohashes in the key value database using the spatial index to allow faster retrieval of geometry object (e.g., insert the geometry object and the generated geohashes as keys at the best fit level in the NoSQL store).

Figure 7:
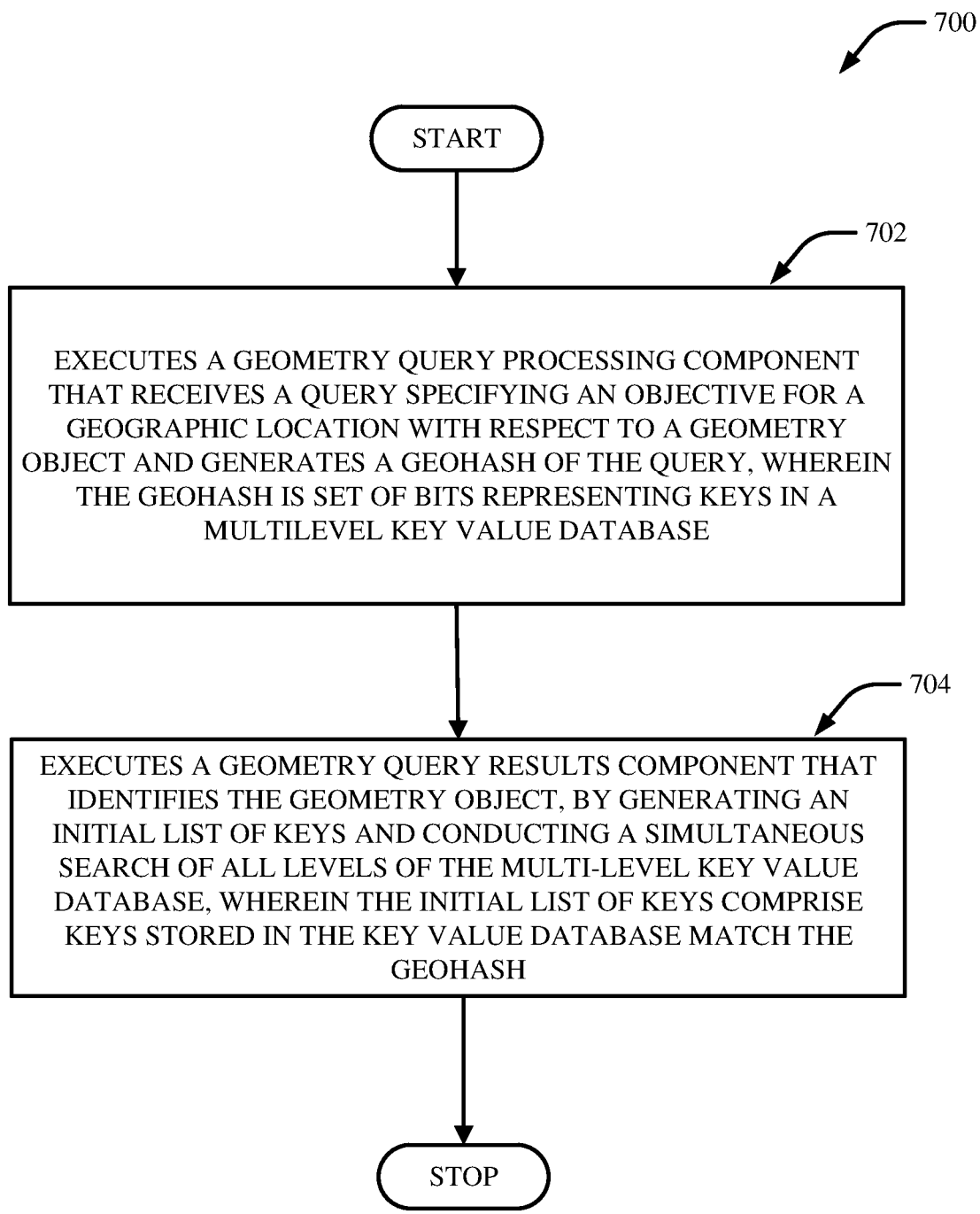
FIG. 7 illustrates a flow diagram of an example, non-limiting computer-implemented method that facilitates extracting a geometry object from the NoSQL store in accordance with one or more embodiments describe herein.

FIG. 7 illustrates a flow diagram of an example, non-limiting computer-implemented method that facilitates extracting a geometry object from the NoSQL store in accordance with one or more embodiments describe herein. Repetitive description of like elements employed in other embodiments described herein is omitted for sake of brevity.

In some examples, flow diagram 700 can be implemented by operating environment 1200 or 100 described below. It can be appreciated that the operations of flow diagram 700 can be implemented in a different order than is depicted.

In non-limiting example embodiments, a computing device (or system) (e.g., computer 1212) is provided, the device or system comprising one or more processors and one or more memories that stores executable instructions that, when executed by the one or more processors, can facilitate performance of the operations as described herein, including the non-limiting methods as illustrated in the flow diagrams of FIG. 7. As a non-limiting example, the one or more processors can facilitate performance of the methods by directing or controlling one or more equipment operable to perform semiconductor fabrication.

An advantage of the method as depicted in FIG. 7 can be that simultaneously searching all levels and generating an initial list of candidates will speed up the search, thereby providing businesses real-time data so they can increase efficiency. By getting real-time data that meets the requestor's objectives, they will use less resources (e.g., external hardware and software communication resources).

Operation 702 depicts receiving, via geometry query processing component 110, a query specifying an objective for a geographic location with respect to a geometry object and generates a geohash of the query, wherein the geohash is a set of bits representing keys in a key value database (e.g., convert the geolocation portion of the received query into one or more geohashes using same technique used to insert the geometry objects which will allow for efficient searching). Operation 704 depicts identifying, via geometry query results component 112, the geometry object, by generating an initial list of keys and conducting a simultaneous search of all levels of the multi-level key value database, wherein the initial list of keys comprise keys stored in the key value database match the geohash (e.g., using the geohashes/keys of the query to search all the level of NoSQL store to find the geometry object).

Figure 8:
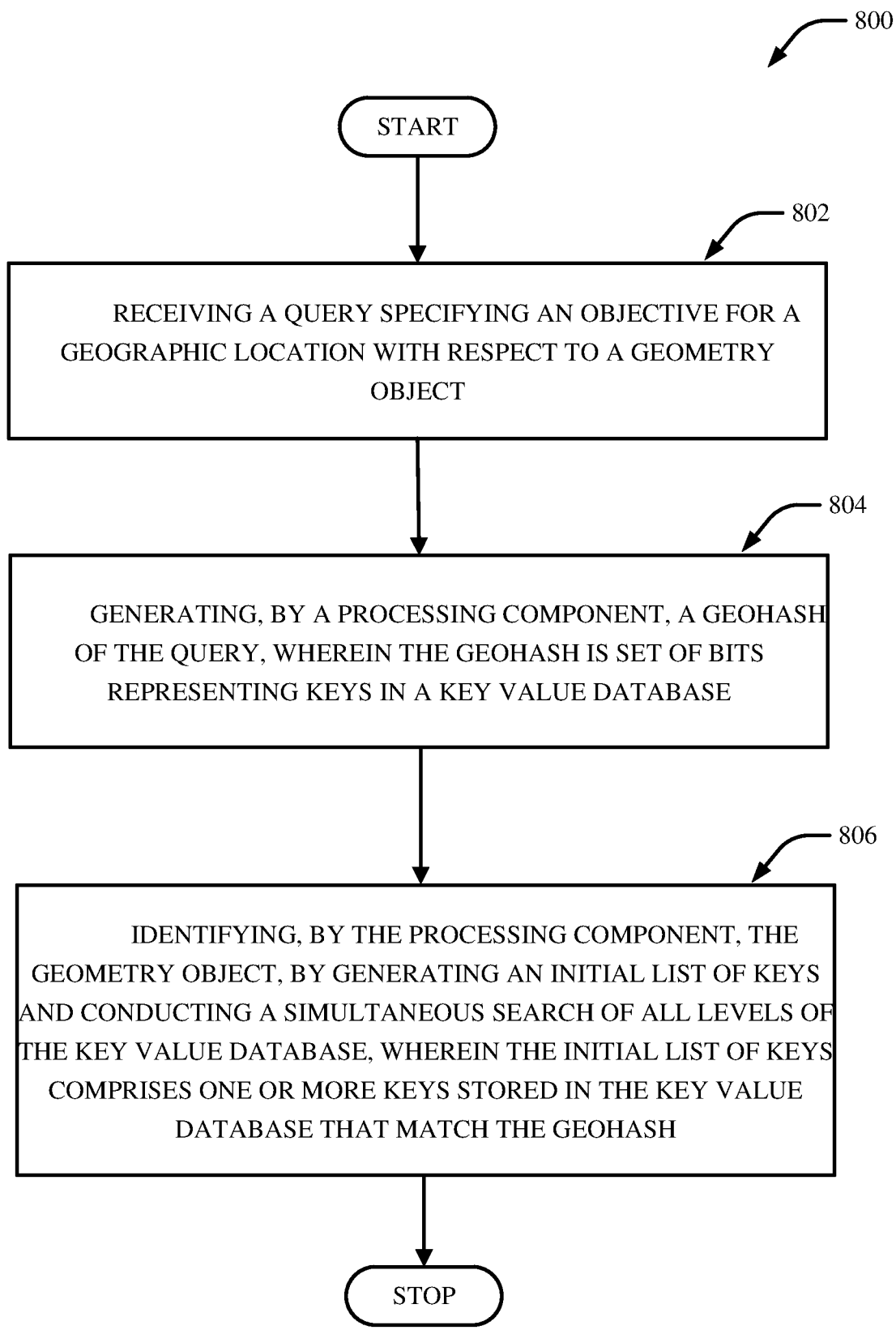
FIG. 8 illustrates a flow diagram of an example, non-limiting computer-implemented method that facilitates extracting a geometry object from the NoSQL store in accordance with one or more embodiments describe herein.

FIG. 8 illustrates a flow diagram of an example, non-limiting computer-implemented method that facilitates extracting a geometry object from the NoSQL store in accordance with one or more embodiments describe herein. Repetitive description of like elements employed in other embodiments described herein is omitted for sake of brevity.

In some examples, flow diagram 800 can be implemented by operating environment 1200 or 100 described below. It can be appreciated that the operations of flow diagram 800 can be implemented in a different order than is depicted.

In non-limiting example embodiments, a computing device (or system) (e.g., computer 1212) is provided, the device or system comprising one or more processors and one or more memories that stores executable instructions that, when executed by the one or more processors, can facilitate performance of the operations as described herein, including the non-limiting methods as illustrated in the flow diagrams of FIG. 8. As a non-limiting example, the one or more processors can facilitate performance of the methods by directing or controlling one or more equipment operable to perform semiconductor fabrication.

An advantage of the method as depicted in FIG. 8 can be that, generating multiple geohashes from the query and simultaneously searching all levels will speed up the search, thereby providing businesses real-time data, so they can increase efficiency. By getting real-time data that meets the requestor's objectives, they will use less resources (e.g., external hardware and software communication resources).

Operation 802 depicts receiving, via geometry query processing component 110, a query specifying an objective for a geographic location with respect to a geometry object. Operation 804 depicts generating, via geometry query results component 112, a geohash of the query, wherein the geohash is a set of bits representing keys in a key value database (e.g., receiving a request to find k-nearest neighbor and taking the geolocation and generating geohashes and using them as keys to find the same type of geohashes in the key values database). Operation 806, identifying, via geometry query results component 112, the geometry object, by generating an initial list of keys and conducting a simultaneous search of all levels of the key value database to allow for fast retrieval of the geometry object, wherein the initial list of keys comprises one or more keys stored in the key value database that match the geohash (e.g., using the geohashes/keys of the query to search all the level of the NoSQL store to find the geometry object).

Figure 9:
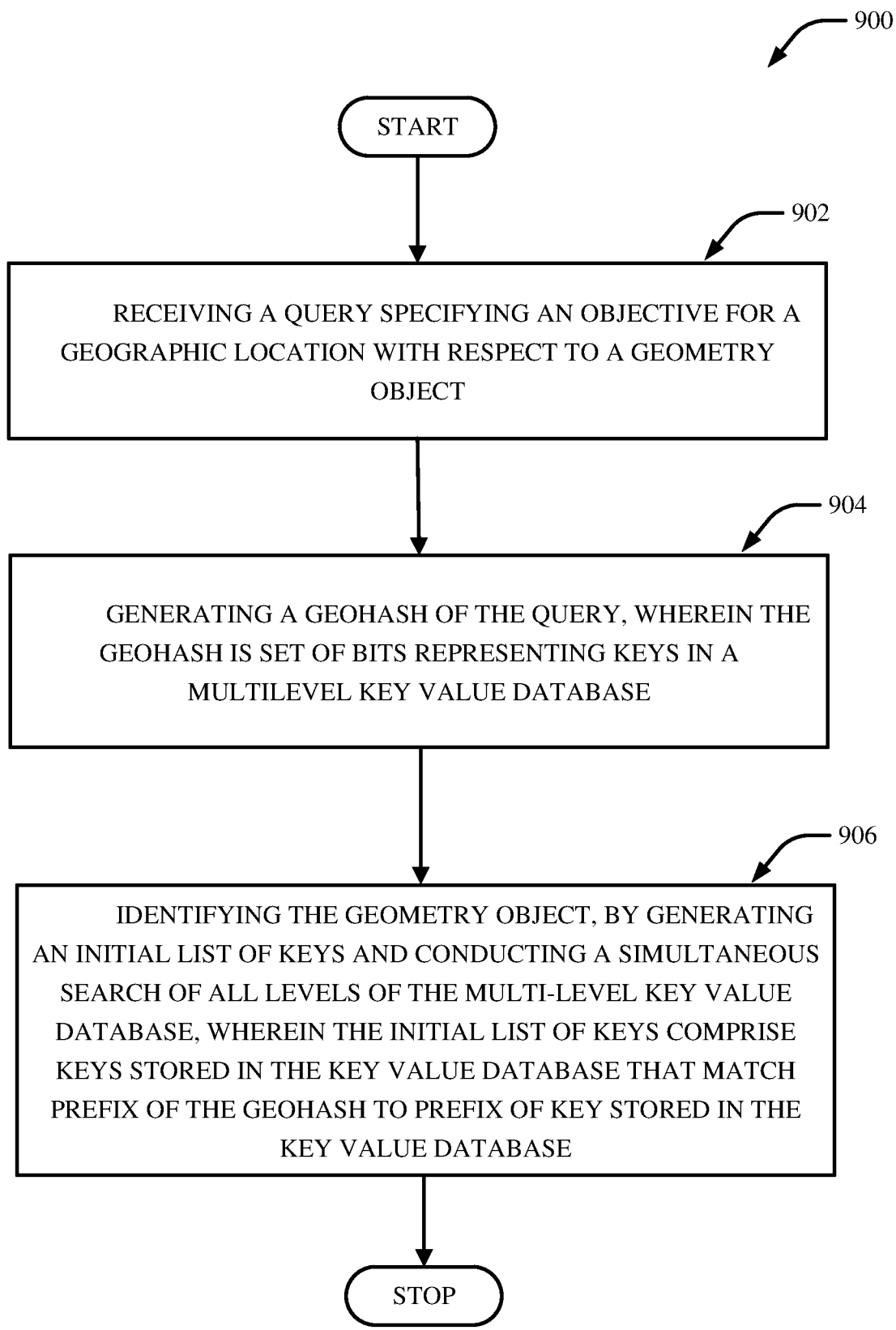
FIG. 9 illustrates a flow diagram of an example, non-limiting computer-implemented product that facilitates extracting a geometry object from the NoSQL store using a query in accordance with one or more embodiments describe herein.

FIG. 9 illustrates a flow diagram of an example, non-limiting computer-implemented product that facilitates extracting a geometry object from the NoSQL store using a query in accordance with one or more embodiments describe herein. Repetitive description of like elements employed in other embodiments described herein is omitted for sake of brevity.

In some examples, flow diagram 900 can be implemented by operating environment 1200 or 100 described below. It can be appreciated that the operations of flow diagram 900 can be implemented in a different order than is depicted.

In non-limiting example embodiments, a computing device (or system) (e.g., computer 1212) is provided, the device or system comprising one or more processors and one or more memories that stores executable instructions that, when executed by the one or more processors, can facilitate performance of the operations as described herein, including the non-limiting methods as illustrated in the flow diagrams of FIG. 9. As a non-limiting example, the one or more processors can facilitate performance of the methods by directing or controlling one or more equipment operable to perform semiconductor fabrication.

An advantage of the method as depicted in FIG. 9 can be that simultaneously searching all levels and searching using a prefix to generate an initial list of candidates will speed up the search, thereby providing businesses real-time data, so they can increase efficiency. By getting real-time data that meets the requestor's objectives, they will use less resources (e.g., external hardware and software communication resources).

Operation 902 depicts receiving, via geometry query processing component 110, a query specifying an objective for a geographic location with respect to a geometry object. Operation 904 depicts generating, via geometry query results component 112, a geohash of the query, wherein the geohash is a set of bits representing keys in a key value database. Operation 906, identifying, via geometry query results component 112, the geometry object, by generating an initial list of keys and conducting a simultaneous search of all levels of the multi-level key value database, wherein the initial list of keys comprises keys stored in the key value database that match the prefix of the geohash to the prefix of the key stored in the key value database (e.g., using the geohashes/keys of the query to search all the level of the NoSQL store to find the geometry object and using a prefix to cut down on unnecessary searching).

Figure 10:
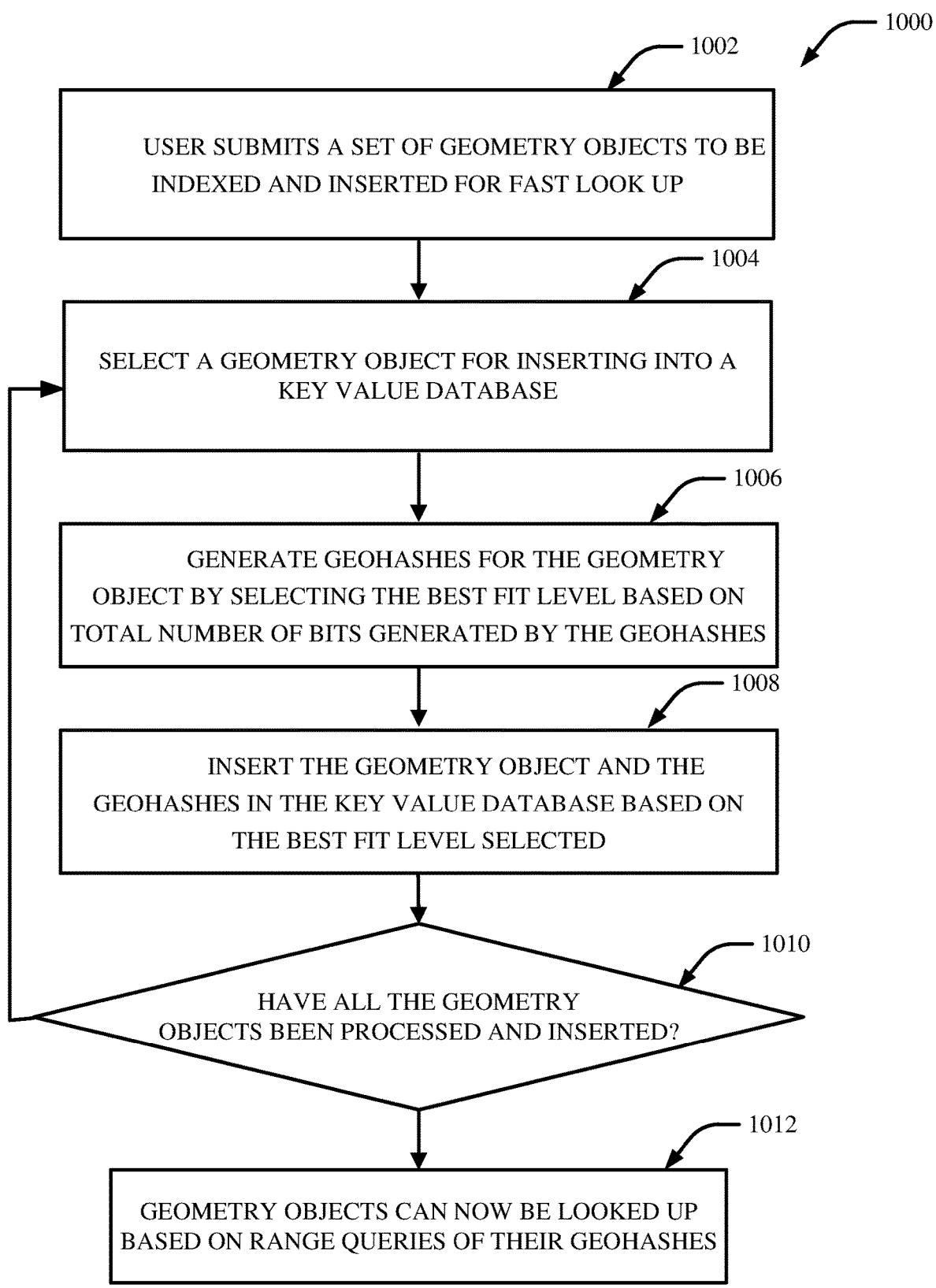
FIG. 10 illustrates a flow chart identifying steps of a non-limiting method that facilitates inserting a geometry object into the NoSQL store in accordance with one or more embodiments describe herein.

FIG. 10 illustrates a flow chart identifying steps of a non-limiting method that facilitates inserting a geometry object into the NoSQL store (e.g., a key value database) in accordance with one or more embodiments describe herein. Repetitive description of like elements employed in other embodiments described herein is omitted for sake of brevity.

At 1002, user submits a set of geometry objects to be indexed and inserted for a fast look up (e.g., via processor 102). At 1004, the processor selects a geometry object, from all the received geometry objects, for inserting into a key value database (e.g., via processor 102). At 1006, the processor generates geohashes for the geometry object by selecting the best fit level (e.g., levels defined for a NoSQL store based a resolution, wherein 0 level represents the very large geometry, such as the Atlantic Ocean or the earth) based on the total number of bits generated by the geohashes (e.g. via geometry hashing component 104). At 1008, the processor can insert the geometry object and the geohashes in the key value database based on the best fit level selected (e.g., via geometry storing component 108). At 1010, the processor checks to determine if all the geometry objects have to be processed and inserted (e.g., via processor 102). If so, at 1012, the NoSQL store is ready for use (e.g., via processor 102). Otherwise, the processor selects another geometry object to process at 1004.

Figure 11:
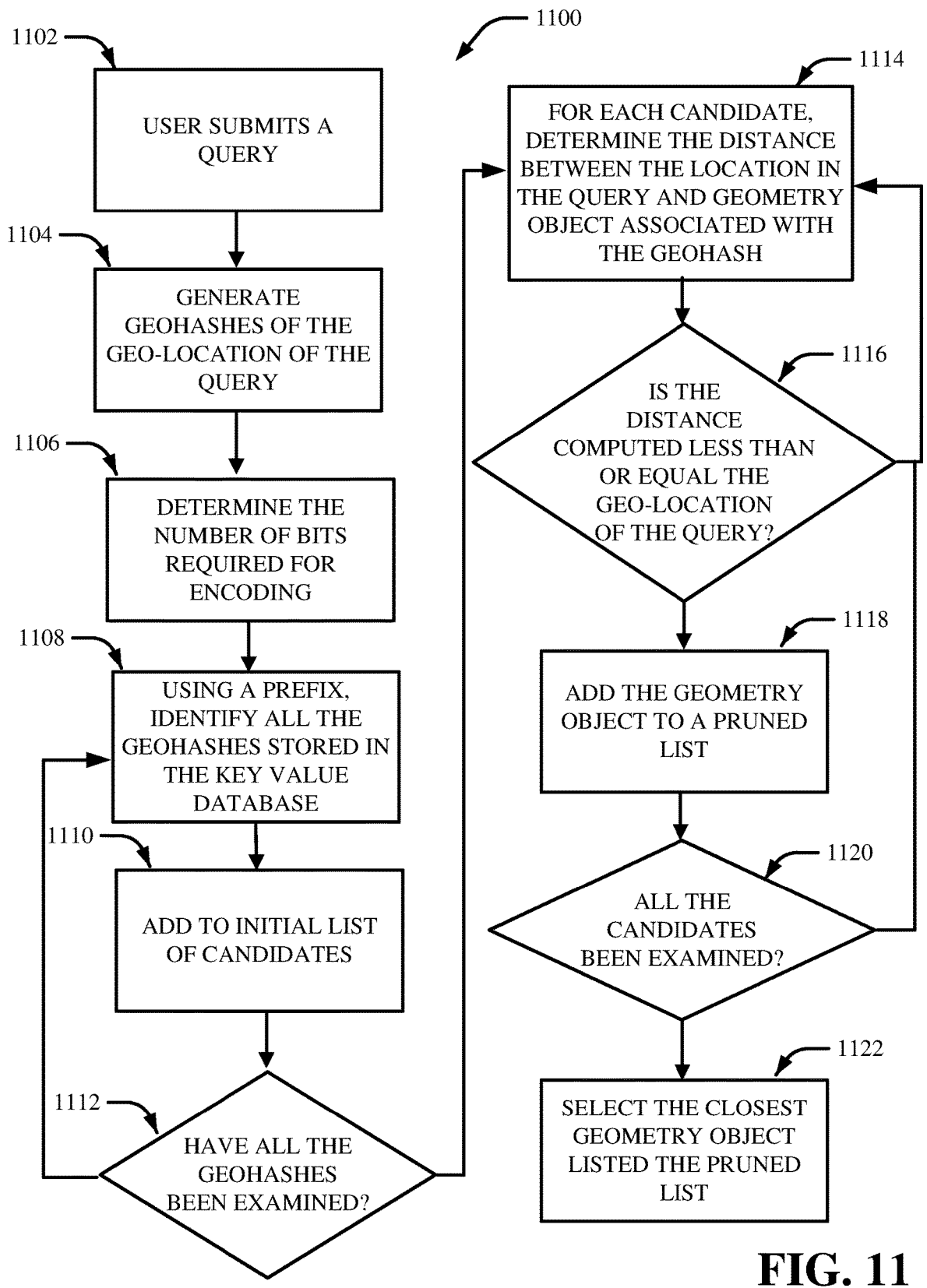
FIG. 11 illustrates a flow chart identifying steps of a non-limiting method that facilitates extracting a geometry object based on a query in accordance with one or more embodiments describe herein.

FIG. 11 illustrates a flow chart identifying steps of a non-limiting method for extracting geometry object based on a query. Repetitive description of like elements employed in other embodiments described herein is omitted for sake of brevity.

At 1102, a user submits a query (e.g. via processor 102). At 1104, the processor generates geohashes of the geolocation of the query (e.g., via geometry query processing component 110). At 1106, the processor, via geometry query processing component 110, determines the number of bits required for encoding (e.g., knowing the size of the geolocation, the search be limited to a specific level the geometry object is stored). In an embodiment, all levels are searched in parallel. In another embodiment, using similar techniques discussed above to generate the spatial index, the best fit level associated with spatial index is searched. The advantage of using either the parallel search or a targeted search is that the results can be obtained quickly. At 1108, the processor, using a prefix of the generated geohash, identifies all the geohashes stored in the key value databases and at 1110 adds the geohashes in an initial list of candidates (e.g., first identify all the geohashes that match the geohash generated from query before conducting a deeper analysis, via geometry query component 112). At 1112, the processor checks if all the geohashes have been examined (e.g. via geometry query component 112). If not, at 1108, the processor identifies additional geohashes to examine Otherwise, once the initial list is generated, at 1114, for each candidate, the processor determines the distance between the location in the query and geometry object associated with the geohash (via geometry query component 112). At 1116, the processor determines if the distance computed is less than or equal to the geolocation of the query (via geometry query component 112). If so, at 1118, the processor considers the match as a possible result and adds to a pruned list (e.g., pruned list comprises the list possible candidates that matched the geometry object examination, via geometry query component 112). At 1120, the processor checks if all the candidates have been examined (via geometry query component 112). If so, then at 1122, the processor further selects the closest geometry object listed in the pruned list (via geometry query component 112). Otherwise, next candidate from the initial list is examined at 1114.

Figure 12:
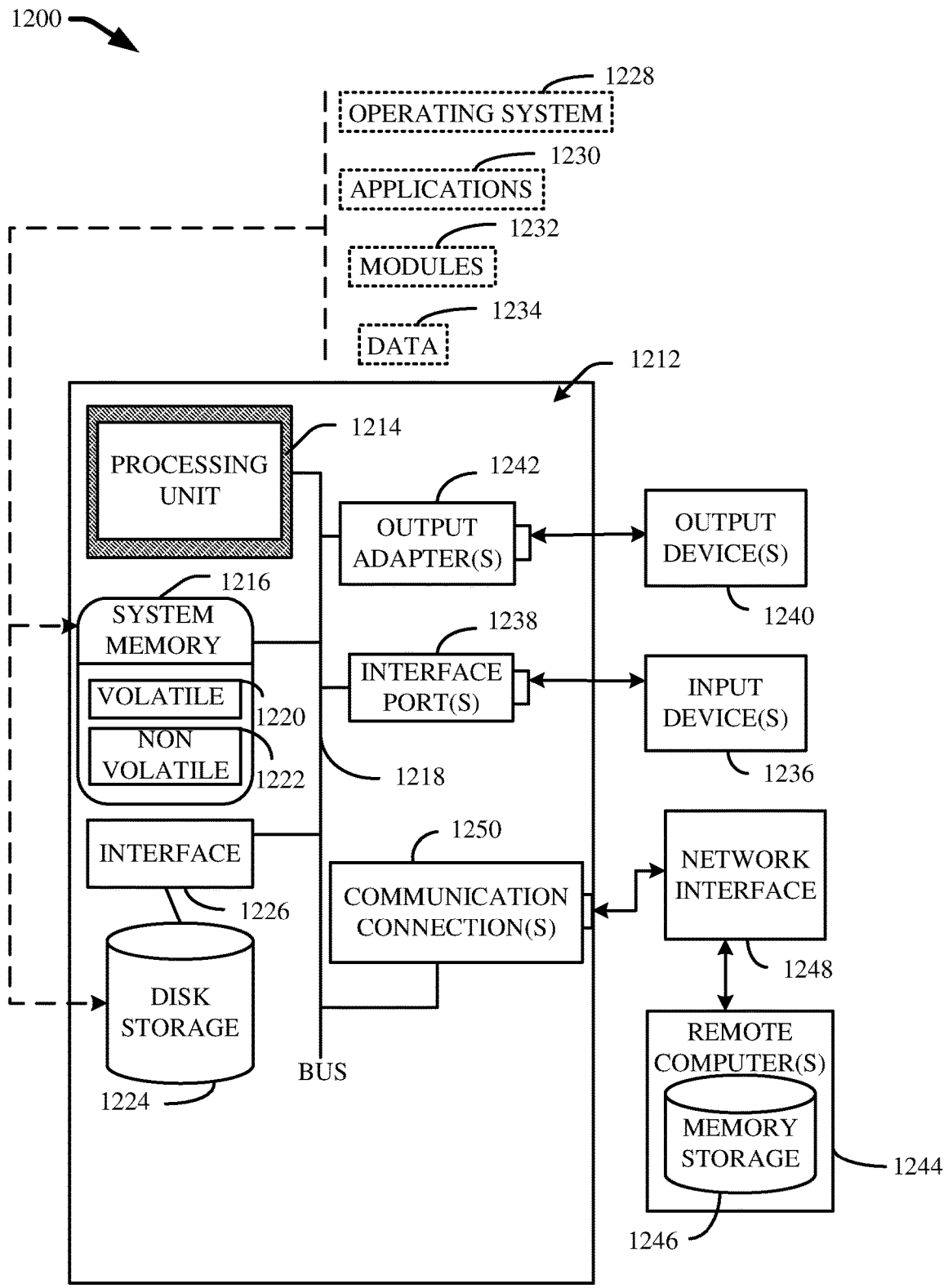
FIG. 12 is a schematic diagram of an example operating environment in accordance with one or more implementations described herein.

To provide context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

A suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1294), and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/non-volatile computer storage media. FIG. 8 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used, such as interface 1226. FIG. 8 also depicts software that acts as an intermediary between users and the basic computer resources described in the suitable operating environment 1201. Such software can also include, for example, an operating system 1228. Operating system 1228, which can be stored on disk storage 1224, acts to control and allocate resources of the computer 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Embodiments of the present innovation may be a system, a method, an apparatus and/or a computer program product at any possible technical detail level of integration. The computer program product can include a computer readable storage medium (or media) having computer readable program instructions thereon for causing a processor to carry out aspects of the present innovation. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present innovation can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present innovation.

Aspects of the present innovation are described herein with reference to flowchart illustrations and/or block diagrams of methods, apparatus (systems), and computer program products according to embodiments of the innovation.

It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present innovation. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, singlecore processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a geometry hashing component that generates one or more geohashes for a geometry object, wherein the one or more geohashes includes one or more encoded bits to store as keys in a key value database;
        a geometry indexing component that generates a spatial index, wherein the spatial index is based on a total number of the one or more encoded bits generated for the one or more geohashes, wherein a geohash of the one or more geohashes is a single dimensional key determined from a multi-dimensional geometry object, and wherein spatial indexing generates multiple ones of the geohashes, wherein the multiple ones of the geohashes are multiple, single dimensional keys that are generated from the multi-dimensional geometry object, wherein the geometry indexing component determines a maximum number of geohashes to encode using dimension information of the geometry object, wherein the dimension information comprises spatial data, altitude and time; and
        a geometry storing component that inserts the geometry object and the one or more geohashes in the key value database using the spatial index to allow for faster retrieval of the geometry object, wherein the processor employs information from the geohashes is employed to identify a best fit level for a defined multi-level store into which to insert the geometry object, wherein a total number of levels of the defined multi-level store is based on the intended purpose of the defined multi-level store, wherein each level of the defined multi-level store corresponds to a different spatial index, wherein a first spatial index corresponding to a first level of the multi-level store stores geometry objects that produce an undetermined number of bits, and wherein other spatial indexes corresponding to other levels of the multi-level store stores geometry objects that produce a number of bits within a corresponding range of bits.

2. The system of claim 1, wherein a geohash of the one or more geohashes represents a single spatial dimensional range value, and wherein the single spatial dimensional range value is based on latitude and longitude values.

3. The system of claim 1, wherein the key value database includes one or more levels to efficiently store the geometry object and to allow for faster retrieval of the geometry object.

4. The system of claim 1, wherein the one or more geohashes further comprises a prefix, and wherein a geohash bit depth table comprise a level value, a number of bits value and a range value.

5. The system of claim 1, wherein the key value database further comprises one or more levels, and wherein a single level of the one or more levels is used to store the geometry object.

6. The system of claim 1, wherein the key value database further comprises one or more levels, and wherein a total number of levels allocated to the key value database is defined for the key value database.

7. A computer-implemented method, comprising:
generating, by a geometry hashing component operatively coupled to a processor, one or more geohashes for a geometry object of geometry objects, wherein the one or more geohashes includes one or more encoded bits stored as keys in a key value database;
generating, by a geometry indexing component operatively coupled to the processor, a spatial index of spatial indexes, wherein the spatial index is based on a total number of the one or more encoded bits generated for the one or more geohashes; and
inserting, by a geometry storing component operatively coupled to the processor, the geometry object and the one or more geohashes in the key value database using the spatial index to allow for faster retrieval of the geometry object, wherein generating the spatial index further comprises determining a maximum number of geohashes to encode using dimension information of the geometry object, wherein the maximum number of geohashes to encode is equal to $3^n-1$, wherein n is the number of dimensions of the geometry object, wherein a total number of levels within the key value database is based on the intended purpose of the key value database and wherein each level of the key value database corresponds to a different spatial index, wherein a first spatial index corresponding to a first level of the multi-level store stores geometry objects that produce an undetermined number of bits, and wherein other spatial indexes corresponding to other levels of the multi-level store stores geometry objects that produce a number of bits within a corresponding range of bits.

8. The computer-implemented method of claim 7, wherein the key value database further comprises one or more levels to efficiently store the geometry object and allow for faster retrieval of the geometry object.

9. The computer-implemented method of claim 7, wherein the one or more geohashes further comprises a prefix.

10. The computer-implemented method of claim 7, wherein the key value database further comprises one or more levels, wherein a single level of the one or more levels is used to store the geometry object.

11. The computer-implemented method of claim 7, wherein the key value database further comprises one or more levels, wherein the total number of levels allocated to the key value database is defined for the key value database.

12. A system, comprising:
a memory that stores computer executable components;
a processor that executes the computer executable components stored in the memory, wherein the computer executable components comprise:
a geometry query processing component that receives a query specifying an objective for a geographic location with respect to a geometry object and generates a geohash of geohashes based on the query, wherein the geohash is a set of bits representing a key in a key value database, and wherein a total number of levels within the key value database is based on the intended purpose of the key value database and wherein each level of the key value database corresponds to a different spatial index; and
a geometry query results component that identifies the geometry object, by generating an initial list of keys and conducting a simultaneous search of all levels of the key value database to allow for fast retrieval of the geometry object, wherein the initial list of keys comprises one or more keys stored in the key value database that match the geohash, wherein search geometry and search radius are converted into the geohashes by computing a bounding box for the search geometry, stretching the bounding box by the search radius, covering the bounding box with no more than $3^n-1$ geohashes, wherein n is a dimension of the geometry object, wherein a first spatial index corresponding to a first level of the multi-level store stores geometry objects that produce an undetermined number of bits, and wherein other spatial indexes corresponding to other levels of the multi-level store stores geometry objects that produce a number of bits within a corresponding range of bits.

13. The system of claim 12, wherein the geometry query results component uses a prefix of a key stored in the key value database and a prefix of the geohash to generate the initial list of keys.

14. The system of claim 12, wherein the geometry query results component generates a pruned list of keys, wherein the pruned list of keys comprises a set of keys that match the objective.

15. The system of claim 14, wherein the geometry query results component compares the geometry object associated with each key of the pruned list of keys against uses of the objective to identify the geometry object.

16. The system of claim 12, wherein the query further comprises a distance-based objective.

17. The system of claim 12, wherein the query further comprises a nearest-based objective.

18. A computer-implemented method, comprising:
receiving, by a geometry query processing component operatively coupled to a processor, a query specifying an objective for a geographic location with respect to a geometry object;
generating, by the geometry query processing component, a geohash of the query, wherein the geohash is a set of bits representing keys in a key value database and wherein a total number of levels within the key value database is based on the intended purpose of the key value database and wherein each level of the key value database corresponds to a different spatial index; and
identifying, by the geometry query results component operatively coupled to the processor, the geometry object, by generating an initial list of keys and conducting a simultaneous search of all levels of the key value database to allow for fast retrieval of the geometry object, wherein the initial list of keys comprises one or more keys stored in the key value database that match the geohash, wherein search geometry and search radius are converted into the geohashes by computing a bounding box for the search geometry, stretching the bounding box by the search radius and covering the bounding box with no more than $3^n-1$ geohashes, wherein n is a dimension of the geometry object, wherein a first spatial index corresponding to a first level of the multi-level store stores geometry objects that produce an undetermined number of bits, and wherein other spatial indexes corresponding to other levels of the multi-level store stores geometry objects that produce a number of bits within a corresponding range of bits.

19. The computer-implemented method of claim 18, further comprising:
generating, by the geometry query results component, a pruned list of keys, wherein the pruned list of keys comprises a set of keys that match the objective.

20. The computer-implemented method of claim 19, further comprising:

using, by the geometry query results component, a prefix of a key stored in the key value database for generating the initial list of keys.

21. A computer program product for inserting and extracting geolocation data using spatial indexing in a key value database, the computer program product comprising a computer readable storage medium having program instructions embodied therewith, the program instructions executable by a processor to cause the processor to:

receive, by the processor, a query specifying an objective for a geographic location with respect to a geometry object;

generate, by the processor, a geohash of the query, wherein the geohash is a set of bits representing keys in a key value database, wherein a total number of levels within the key value database is based on the intended purpose of the key value database and wherein each level of the key value database corresponds to a different spatial index; and identify, by the processor, the geometry object, by generating an initial list of keys and conducting a simultaneous search of all levels of the key value database to allow for fast retrieval of the geometry object, wherein the initial list of keys comprises a set of keys stored in the key value database that match a prefix of the geohash to a prefix of a key stored in the key value database, wherein search geometry and search radius are converted into the geohashes by computing a bounding box for the search geometry, stretching the bounding box by the search radius and covering the bounding box with no more than $3^n-1$ geohashes, wherein n is a dimension of the geometry object, wherein a first spatial index corresponding to a first level of the multi-level store stores geometry objects that produce an undetermined number of bits, and wherein other spatial indexes corresponding to other levels of the multi-level store stores geometry objects that produce a number of bits within a corresponding range of bits.

22. The computer program product of claim 21, wherein the program instructions are further executable by the processor to cause the processor to:

generate, by the processor, a pruned list of keys, wherein the pruned list of keys comprises a list of keys that match the objective.

* * * * *